(12) United States Patent
Dong et al.

(10) Patent No.: US 7,310,698 B2
(45) Date of Patent: Dec. 18, 2007

(54) METHOD AND APPARATUS FOR EXTENDING MEMORY ADDRESSING

(75) Inventors: Xin Dong, Beijing (CN); Chuanen Jin, Beijing (CN); Qingyun Cheng, Shang Hai (CN); Gongcheng Li, Beijing (CN)

(73) Assignee: Vimicro Corporation, Beijing (CN)

( * ) Notice: Subject to any disclaimer, the term of this patent is extended or adjusted under 35 U.S.C. 154(b) by 258 days.

(21) Appl. No.: 11/304,099

(22) Filed: Dec. 14, 2005

(65) Prior Publication Data
US 2006/0149888 A1 Jul. 6, 2006

(30) Foreign Application Priority Data
Dec. 31, 2004 (CN) .................. 2004 1 0103983

(51) Int. Cl.
*G06F 12/00* (2006.01)
(52) U.S. Cl. ......................... 711/2; 711/202
(58) Field of Classification Search ............ None
See application file for complete search history.

(56) References Cited
U.S. PATENT DOCUMENTS

| | | | | |
|---|---|---|---|---|
| 5,237,669 A | * | 8/1993 | Spear et al. ............... | 711/2 |
| 5,317,706 A | * | 5/1994 | Pechter ..................... | 711/2 |
| 5,488,708 A | * | 1/1996 | Hayashi .................... | 711/115 |
| 6,434,688 B1 | * | 8/2002 | Rhoden et al. ............ | 712/34 |
| 7,206,915 B2 | * | 4/2007 | DeSouter et al. .......... | 711/203 |

* cited by examiner

*Primary Examiner*—T Nguyen
(74) *Attorney, Agent, or Firm*—Joe Zheng

(57) ABSTRACT

Techniques for extending memory addressing with more accessing range are disclosed. According to one aspect of the techniques, an apparatus for extending addressing space comprises a plurality of extended memories, each being allocated an unique identifier, a direct addressing memory reserving a data cell as a public identifier cell for receiving the identifier of each of the extended memories to be accessed, a decision unit determining that which one of the extended memories is to be accessed by comparing an identifier received by the public identifier cell with the identifier of each of the extended memories, and a mapping unit mapping one of the extended memories determined by the decision unit to be accessed onto the direct addressing memory so that the one of the extended memories can be indirectly accessed by directly accessing the direct addressing memory.

11 Claims, 5 Drawing Sheets

METHOD AND APPARATUS FOR EXTENDING MEMORY ADDRESSING

BACKGROUND OF THE INVENTION

1. Field of the Invention

The present invention relates to a microcomputer system, and more particularly to apparatus and method for extending memory addressing.

2. Description of Related Art

In microcomputer systems, CPUs (Central Processing Units), buses and memories are kernel parts. Buses include a data bus and an address bus, the former is used to transmit data among devices, the latter is used to transmit addresses of the data. The direct addressing space of the CPU depends on the width of the address bus. For example, the direct address space of a 20-bit address bus is 1 MB, while the direct address space of a 24-bit address bus can reach 16 MB.

With the development of technology, the processing power of a CPU improves dramatically. Meanwhile, the capacity of the memory is becoming larger and larger. However, because of the limits in the width of the address bus, the addressing space of the CPU is limited. Hence, techniques for extending addressing space are desired.

One conventional approach to extend the addressing space is shown in FIG. 1. The apparatus 100 includes a Direct Addressing Memory (DAM) 110, a mapping unit 150 and N extended memories 140, where N is a finite integer. Each data cell of the DAM 110 can be directly addressed according to address signal transmitted over an address bus 120. It is assumed that the width of the address bus 120 is designated as Wa and the width of a data bus is designated as Wd, the maximum amount k of the data cells in the DAM 110 is equal to $2^{Wa}$, the size of each data cell is equal to the width Wd of the data bus 130.

After acquiring the address signal from the address bus 120, the DAM 110 finds corresponding data cell thereof according to the address signal, subsequently, writing data in the data bus 130 into the data cell or providing data from the data cell and exporting them to data bus 130. The mapping unit 150 finds data cells of corresponding extended memories 140 according to data information stored in the DAM 110 and establishes a mapping relationship between data cells of the extended memories 140 and the corresponding data cells of the DAM 110. Thus, the CPU can access the data cells of the extended memories 140 by means of accessing the data cells of the DAM 110.

Referring to FIG. 2, the data cells of the DAM 110 is mapped onto the data cells of the extended memories 140. Every two neighboring data cells of the DAM 110 work as one group which corresponds to one of the extended memories 140. The first data cell of one group is used to store the address of a corresponding extended memory (i.e., one of the N memories 140). The second one of the one group is mapped onto one data cell of the corresponding extended memory. Specifically, the data cells 1 and 2 of the DAM work as one group which corresponds to the extended memory 1, where the data cell 1 is used to store the address of the extended memory 1, the data cell 2 is used as the mapping of one data cell of the extended memory 1. Analogically, the data cell 2N−1 and the data cell 2N work as one group which corresponds to the extended memory N. The data cell 2N−1 is used to store the address of the extended memory N. The data Cell 2N is used as the mapping of one data cell of the extended memory N.

The operation for extending addressing space can be described in conjunction with FIG. 2. When reading or writing operation is needed for a data cell s of an extended memory m, the CPU writes s into the data cell 2m−1 of the DAM. Because the extended memory m corresponds to the data cell 2m−1, the mapping unit 150 of FIG. 1 knows that the accessing operation is for the extended memory m. According to the value s in the data cell 2m−1, the mapping unit 150 finds the sth data cell of the extended memory m. Subsequently, the data cell 2m of the DAM is mapped onto the data cell s of the extended memory m. Finally, the CPU can achieve the indirect access operation to the data cell s of the extended memory m by means of directly reading or writing the data cell 2m of the DAM.

When the width of the address bus is Wa and the width of the data bus Wd, the maximum amount n of the extended memories which can be supported by extending addressing space to $2^{Wa-1}$, the maximum amount a of the data cells in each extended memory is equal to $2^{Wd}$. Therefore, the maximum extended addressing space is $2^{Wa+Wd-1}$.

It can be seen that the above extending approach must write the address of the data cell of the extended memory into the DAM every time before reading or writing operation to the data cell of the extended memory can happen. Only when the mapping relationship between the data cells is found, the reading and writing operation can be performed. The approach described above has to be repeated in each writing or reading operation to the data cell, thus seriously decreasing the processing speed of the system. Meanwhile, nearly a half of the DAM's space is used as the mapping of the data cell of the extended memory and another half is used for addressing, which results in smaller total extending addressing space.

Thus there is a need for techniques for extending addressing space with more accessed efficiency.

SUMMARY OF THE INVENTION

This section is for the purpose of summarizing some aspects of the present invention and to briefly introduce some preferred embodiments. Simplifications or omissions in this section as well as in the abstract or the title of this description may be made to avoid obscuring the purpose of this section, the abstract and the title. Such simplifications or omissions are not intended to limit the scope of the present invention.

In general, the present invention pertains to techniques for extending addressing space with more accessed efficiency. According to one aspect of the techniques, an apparatus for extending addressing space comprises a plurality of extended memories, each being allocated an unique identifier, a direct addressing memory reserving a data cell as a public identifier cell for receiving the identifier of each of the extended memories to be accessed, a decision unit determining that which one of the extended memories is to be accessed by comparing an identifier received by the public identifier cell with the identifier of each of the extended memories, and a mapping unit mapping one of the extended memories determined by the decision unit to be accessed onto the direct addressing memory so that the one of the extended memories can be indirectly accessed by directly accessing the direct addressing memory.

The present invention may be implemented in software and hardware as a method, an apparatus or a part of a system. According to one embodiment, the present invention is a method for extending addressing space, the method comprises allocating an unique identifier for each of extended memories, reserving a public identifier cell for a direct addressing memory, writing the identifier of each of the extended memories to be accessed into the public identifier cell, determining which one of the extended memories to be accessed, and mapping the direct addressing memory onto the determined extended memory so that the one of the extended memories can be indirectly accessed by directly accessing the direct addressing memory.

One of the features, benefits and advantages in the present invention is to provide techniques for expanding memory addressing.

Other objects, features, and advantages of the present invention will become apparent upon examining the following detailed description of an embodiment thereof, taken in conjunction with the attached drawings.

BRIEF DESCRIPTION OF THE DRAWINGS

These and other features, aspects, and advantages of the present invention will become better understood with regard to the following description, appended claims, and accompanying drawings where:

FIG. 4 is a block diagram showing a mapping relationship between a direct addressing memory and a plurality of extended memories of the apparatus shown in FIG. 3a;

DETAILED DESCRIPTION OF THE INVENTION

The detailed description of the present invention is presented largely in terms of procedures, steps, logic blocks, processing, or other symbolic representations that directly or indirectly resemble the operations of devices or systems contemplated in the present invention. These descriptions and representations are typically used by those skilled in the art to most effectively convey the substance of their work to others skilled in the art.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams or the use of sequence numbers representing one or more embodiments of the invention do not inherently indicate any particular order nor imply any limitations in the invention.

Different from the prior art system in which a single data cell of the DAM is mapped onto data cells of one extended memory, according to one aspect of the present invention, an entire space of a Direct Addressing Memory (DAM) is provided to be mapped onto an entire space of an extended memory in the present invention, thus considerably increasing the accessing efficiency.

Figure 1:
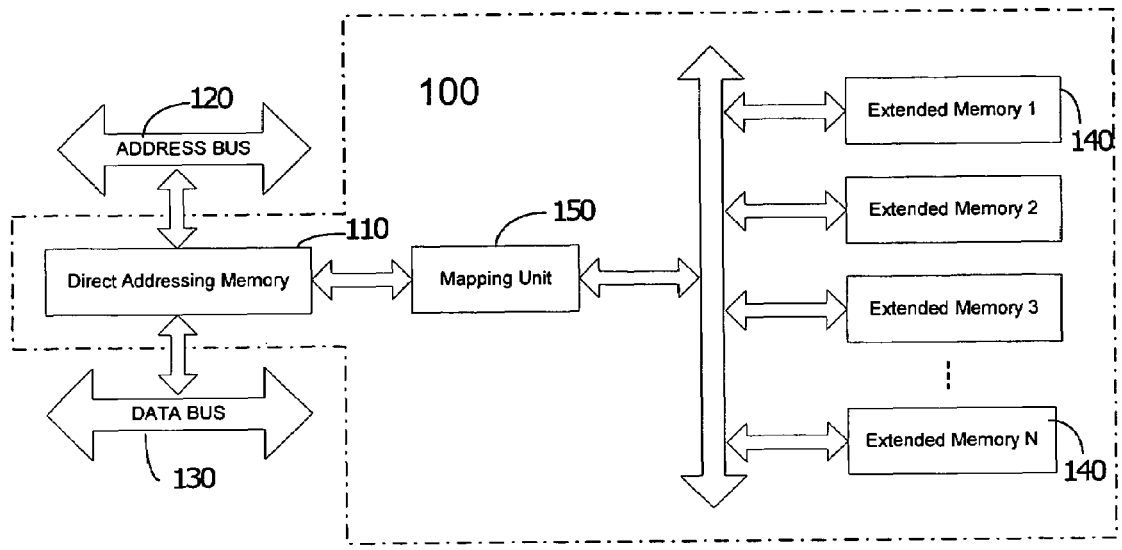
FIG. 1 is a block diagram showing a conventional apparatus for extending address space.
Figure 2:
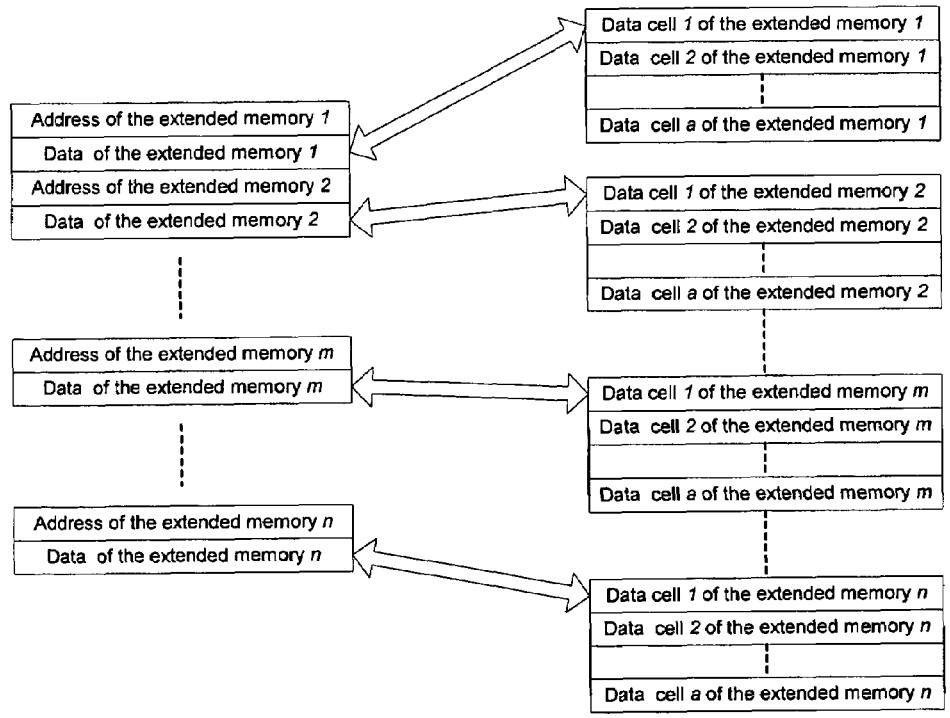
FIG. 2 is a block diagram showing a conventional mapping relationship between a direct addressing memory and a plurality of extended memories.
Figure 3A:
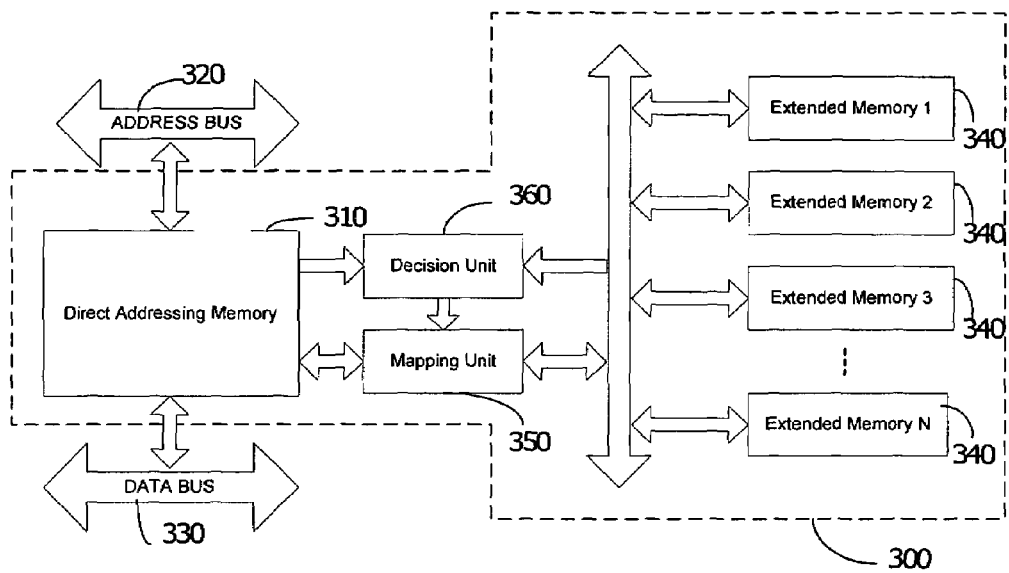
FIG. 3a is a block diagram showing an exemplary apparatus for extending address space according to one embodiment of the present invention.

FIG. 3a shows an exemplary apparatus 300 for extending addressing space according to one embodiment of the present invention. The apparatus 300 comprises a Direct Addressing Memory (DAM) 310, extended memories 1 to N 340, a mapping unit 350 and a decision unit 360. Each data cell of the DAM can be directly located according to an address signal transmitted over an address bus 320, then the data cell of the DAM is able to exchange data with a data bus 330.

Figure 4:
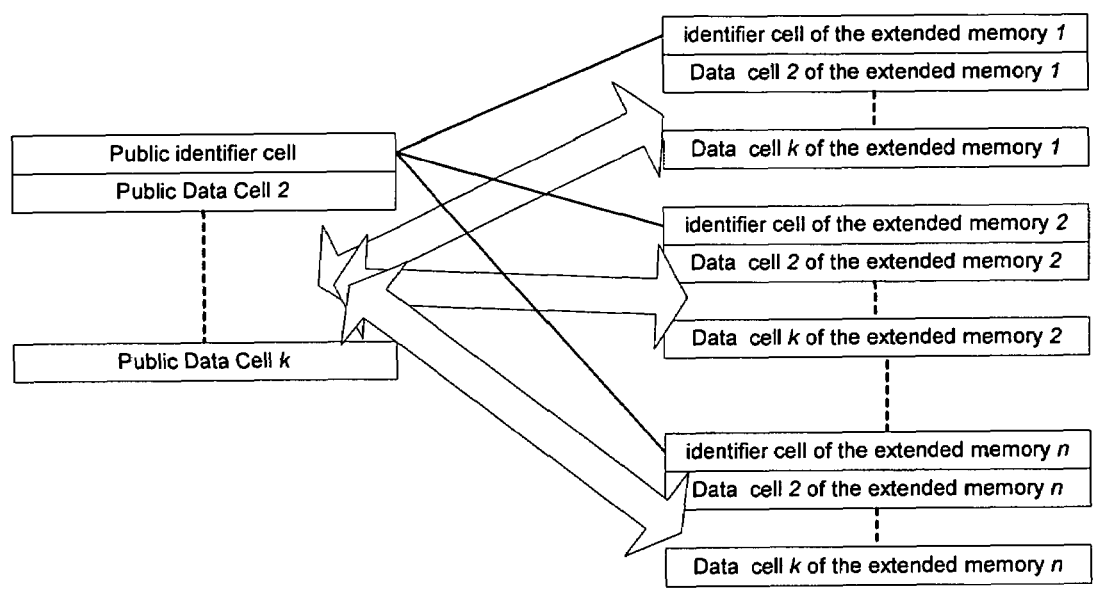

Referring to FIG. 4, each extended memory reserves a data cell thereof as an identifier cell to preserve an identifier thereof. Each extended memory can be uniquely identified by a corresponding identifier. In order to facilitate addressing to the extended memories via corresponding identifiers, the identifier cells of all extended memories have the same address in corresponding extended memories. An identifier cell is only used to preserve the identifier of the extended memory, but not used as one data cell for accessing information. The identifier of each extended memory should be designated at an initialization operation of the extending apparatus 300.

Figure 3B:
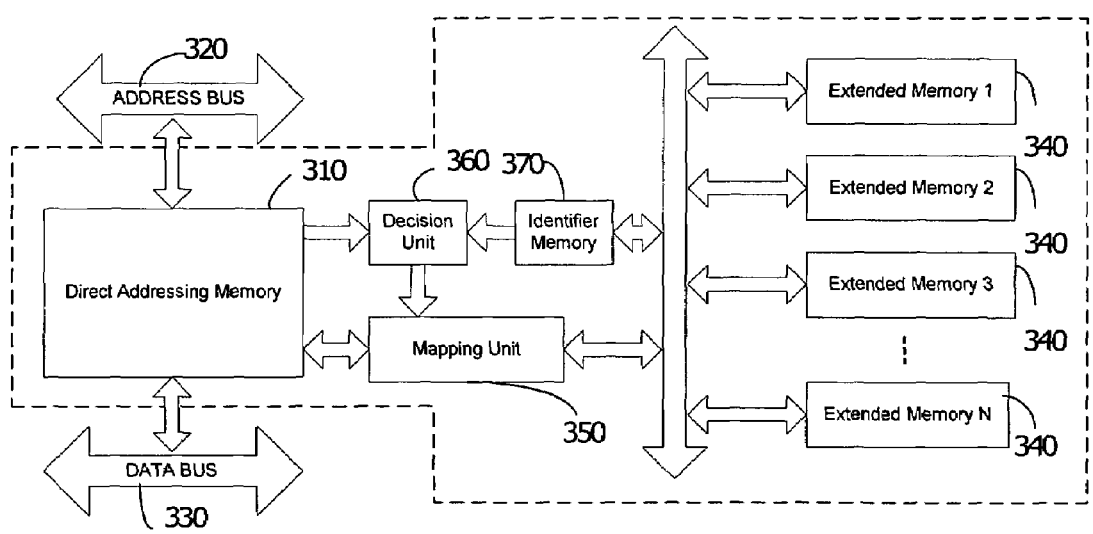
FIG. 3b is a block diagram showing another exemplary apparatus for extending address space according to one embodiment of the present invention.

Referring to FIG. 3b, according to another embodiment, an identifier memory 370 is provided to preserve all identifiers of the extended memories. Thus, each extended memory can be uniquely identified by a corresponding identifier which is stored in the identifiers memory 370. The identifier memory 370 can be a SRAM or NSRAM. In one embodiment, an SRAM is applied, one of the extended memories can be adapted as the identifier memory. In this way, it is also required to initialize identifiers in the identifier memory at the initialization operation of the extending apparatus 300. In another embodiment, an NSRAM is applied, each data cell of the identifier memory should be designated, too. In any case, the value of each identifier is preferably a fixed constant.

Referring to FIG. 4, the DAM 310 reserves one data cell as a public identifier cell to preserve an identifier of one extended memory that waits for being accessed, the public identifier also is not used as one data cell for accessing information. On the condition that each extended memory reserves one identifier cell, in order to facilitate addressing, the public identifier cell of the DAM has the same relative address as the identifiers cell of each extended memory. In one embodiment, the data cell 1 of the DAM is used as the public identifier cell, the data cell 1 of each extended memory is used as the identifier cell.

Figure 5A:
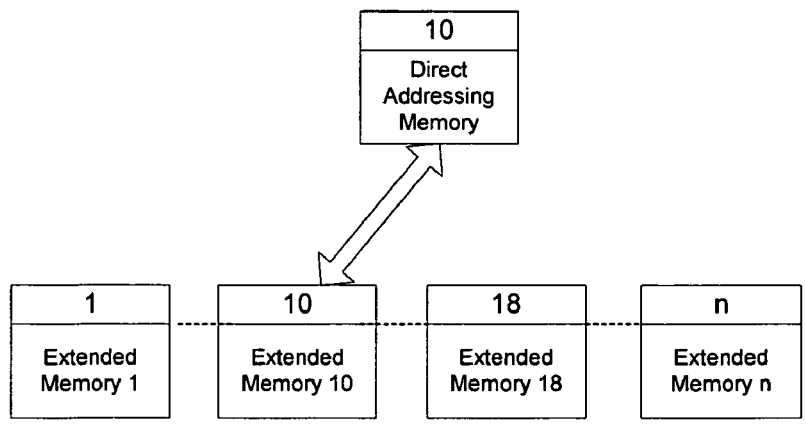
FIGS. 5a-c are block diagrams showing examples of the mapping relationship between the direct addressing memory and the extended memories.
Figure 5B:
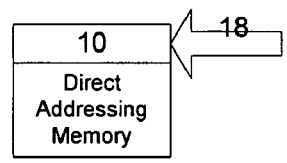
Figure 5C:
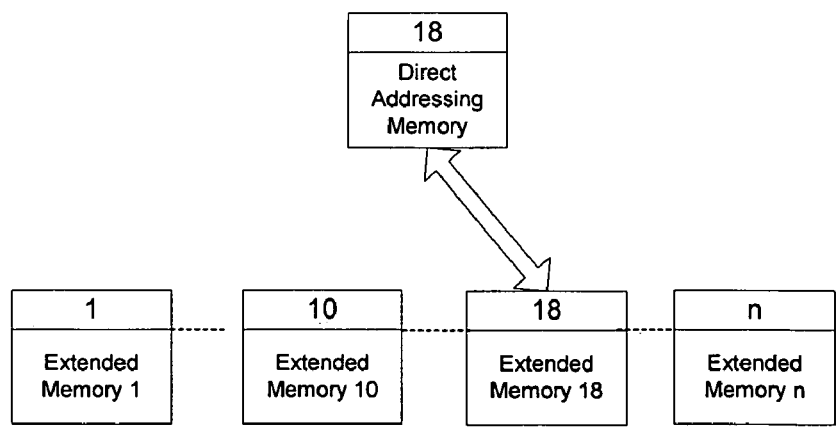

Additionally, once the identifier of one extended memory is written into the public identifier cell of the DAM 110 over the address bus 320, each data cell of the DAM 310 will be mapped onto corresponding data cell of the one extended memory 140. For example, referring to FIG. 5a-5c, it is supposed that numeral 1-n serve as the identifiers of the extended memories 1-n, respectively. In this situation, if writing numeral 10 into the public identifier cell of the DAM 110, each data cells of the DAM 310 will be mapped onto corresponding data cell of the extended memory 10. Similarly, if rewriting numeral 18 into the public identifier cell of the DAM 110 instead of numeral 10, each data cells of the DAM 310 will be mapped onto corresponding data cell of the extended memory 18.

Thus, each data cell of the extended memory can be indirectly accessed by directly accessing one mapped data cell on the DAM 310. In order to make full use of the DAM, the volume of each extended memory should be equal to or more than the volume of the DAM. In one embodiment, the DAM and each extended memories have same volume.

Referring again to FIGS. 3*a* and 5*a*, when one of the extended memories, such as extended memory 10, is required to be accessed, the identifier of the extended memory 10, such as numeral 10 serving as the identifier, is written in the public identifier cell. The decision unit 360 gets the identifier written in the public identifier cell and the identifier of one extended memory to determine if the identifier written in the public identifier cell is the same as the identifier of the extended memory. If yes, the decision unit 360 informs the mapping unit 350, otherwise, the decision unit 360 will continue to get the identifier of the next one extended memory to make a decision mentioned above.

According to the output of the decision unit 360, the mapping unit 350 builds up the mapping relationship between all the data cells of the DAM 310 and corresponding data cells of the extended memory required to be accessed, such as the extended memory 10. As a result, each data cell of the extended memory can be indirectly accessed by directly accessing one mapped data cell on the DAM 310.

Referring to FIG. 3*b*, the decision unit 360 operates similarly except that the decision unit 360 gets the identifier from the identifier memory 370, instead of directly getting from the extended memory.

Supposed that the width of the address bus is Wa, and the width of the data bus is Wd, the maximum total amount k of the data cell of the DAM is $2^{Wa}$. The maximum amount of the data cells which can be used for data access is equal to ($2^{Wa}-1$) due to one data cell of the DAM works as the public identifier cell. Thus, the maximum amount of the data cells of each extended memory which can be used for data access is ($2^{Wa}-1$). According to one embodiment in which the way of setting up page flag is applied and NSRAM is used as the extended memory, the maximum amount N max of the extended memories supported by the extended apparatus is $2^{Wd}$. When one extended memory is used as the identifier memory, the maximum amount N max of the extended memories supported by the extended is ($2^{Wd}-1$). Therefore, the maximum capacity of extended addressing space supported is ($2^{Wd}-1$)($2^{Wa}-1$). As the width of data bus is at least 8 bit, or 16 bit, 32 bit, 64 bit etc, and that of address bus is at least 16 bit, 20 bit or even more, this embodiment greatly increases the memory capacity.

Meanwhile it can be appreciated that many data cell of one certain extended memory is usually to be read or written at one time, when mapping onto one extended memory has been realized as described in the embodiment, direct processing for a series of data cells in a common extended memory can be achieved rather than mapping each time. Thus, the accessing speed to the extended memory can be increased considerably.

Figure 6:
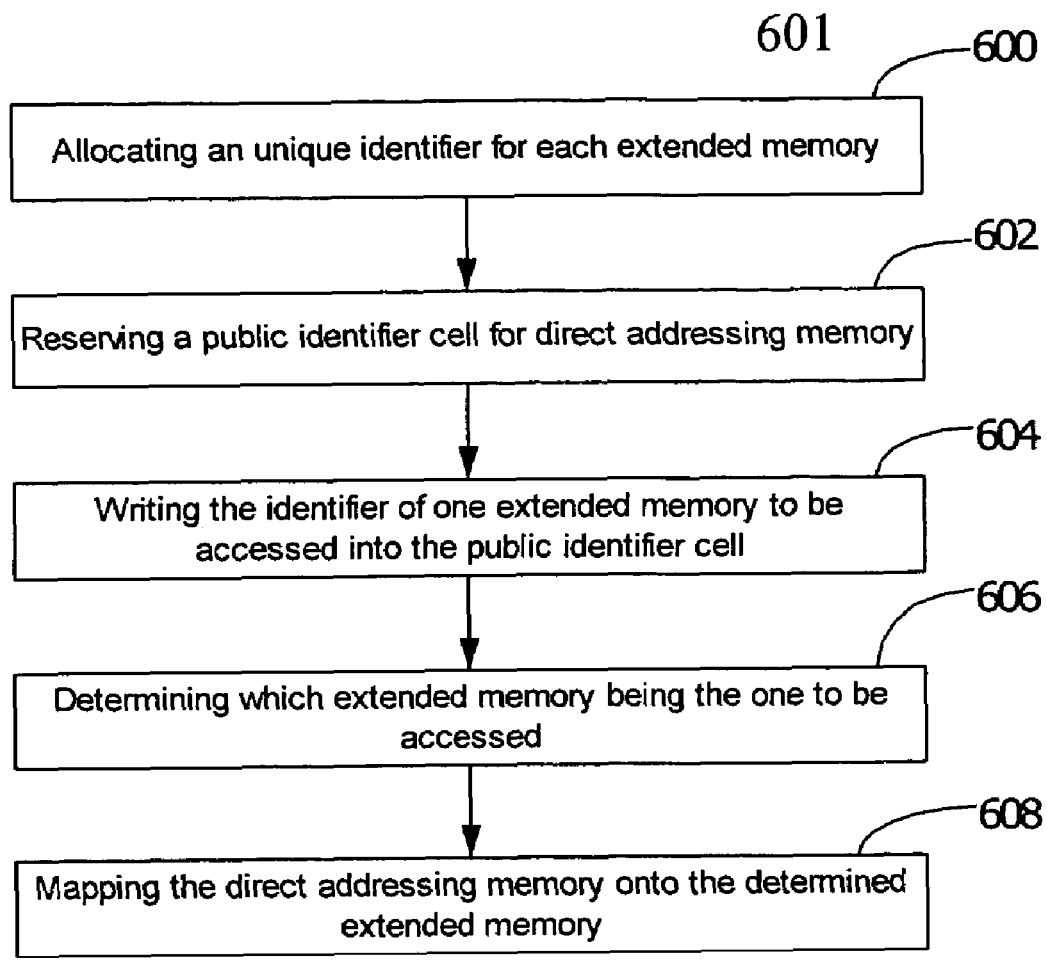
FIG. 6 is a flowchart or process of extending address space according to one embodiment of the present invention.

In order to further understand the present invention, FIG. 6 is a flowchart or process 601 of extending addressing space according to one embodiment of the present invention. The process 601 may be implemented in hardware or software as a method and an apparatus. The process 601 states with an initialization that includes following operation. Each extended memory is allocated an identifier for addressing at 600. Namely, a corresponding relationship is established between the identifier and the extended memory. Thus, each extended memory can be uniquely identified. Additionally, a data cell of the DAM is reserved as a public identifier cell to preserves an identifier of one extended memory to be accessed at 602.

The public identifier cell of the DAM is written the identifier of one extended memory that is to be accessed according to the address bus at 604. At 606, The process 601 finds out which one of the extended memories is to be accessed by comparing the identifier written in the public identifier cell with each of the extended memories. At 608, data cells of the DAM are mapped to corresponding data cells of the extended memories which have an identifier in the public identifier cell. Thus, each data cell of the extended memories can be indirectly accessed by directly accessing one mapped data cell on the DAM 310 until another identifier is written into the public identifier cell.

In a system that adapts the present invention, the space in the DAM except the public identifier cell can be regarded as a logic address space, while the space in each extended memory which has built up the mapping relationship with the DAM can be regarded as a physical address space. In another perspective, the logic address space is being mapped to different physical address spaces according to the change of the identifier in the public identifier cell.

By means of mapping between logic access page and physical access page with page flag, one of the features, advantages and benefits in the present invention includes the access space of DAM that is reused, reducing the width of the address bus. Alternatively, the accessing capacity is now larger than the physical address the data bus can address. Other features, advantages and benefits in the present invention may be appreciated by those skilled in the art.

While the present invention has been described with reference to specific embodiments, the description is illustrative of the invention and is not to be construed as limiting the invention. Various modifications to the present invention can be made to the preferred embodiments by those skilled in the art without departing from the true spirit and scope of the invention as defined by the appended claims.

What is claimed is:

1. An apparatus for extending addressing space, the apparatus comprising:
   a plurality of extended memories, each being allocated an unique identifier;
   a direct addressing memory reserving a data cell as a public identifier cell for receiving the identifier of each of the extended memories to be accessed;
   a decision unit determining that which one of the extended memories is to be accessed by comparing an identifier received by the public identifier cell with the identifier of each of the extended memories;
   a mapping unit mapping one of the extended memories determined by the decision unit to be accessed onto the direct addressing memory so that the one of the extended memories can be indirectly accessed by directly accessing the direct addressing memory.

2. The apparatus as claimed in claim 1, wherein each of the extended memories reserves a data cell as an identifier cell to preserve a unique identifier thereof.

3. The apparatus as claimed in claim 1, further comprising an identifier memory for preserving the identifier of each of the extended memories.

4. The apparatus as claimed in claim 1, wherein each of the extended memories comprises a plurality of data cells for storing data information, the direct addressing memory comprises a plurality of data cells for storing data information.

5. The apparatus as claimed in claim 4, wherein, once the identifier of one of the extended memories to be accessed is written into the public identifier cell, each data cell of the direct addressing memory should be mapped onto a corresponding data cell of the one of the extended memories so that each data cell of the one of the extended memories can be indirectly accessed by directly accessing one mapped data cell on the direct addressing memory.

6. The apparatus as claimed in claim 1, wherein a volume of each of the extended memories is equal to or more than a volume of the direct address memory.

7. The apparatus as claimed in claim 1, wherein a width of an address bus in the apparatus is Wa, and a width of a data bus therein is Wd, a maximum capacity of extended memory addressing for the apparatus is now $(2^{Wd}-1)(2^{Wa}-1)$.

8. A method for extending memory addressing, the method comprising:

allocating an unique identifier for each of extended memories;

reserving a public identifier cell for a direct addressing memory;

writing the identifier of each of the extended memories to be accessed into the public identifier cell;

determining which one of the extended memories to be accessed; and mapping the direct addressing memory onto the determined extended memory so that the one of the extended memories can be indirectly accessed by directly accessing the direct addressing memory.

9. The method as claimed in claim 8, wherein the public identifier cell is a data cell of the direct addressing memory.

10. The method as claimed in claim 8, wherein a volume of each of the extended memories is equal to or more than a volume of the direct address memory.

11. The method as claimed in claim 8, wherein each of the extended memories reserves a data cell as an identifier cell to preserve the unique identifier thereof.

* * * * *